United States Patent
Fujiwara et al.

(10) Patent No.: US 7,190,884 B2
(45) Date of Patent: Mar. 13, 2007

(54) SIGNAL RECORDING APPARATUS AND METHOD, SIGNAL REPRODUCING APPARATUS AND METHOD, MEDIUM, AND INFORMATION ASSEMBLY

(75) Inventors: Yuji Fujiwara, Nishinomiya (JP); Masakazu Nishino, Kashiwara (JP); Mitsuhiro Miyashita, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1305 days.

(21) Appl. No.: 09/811,682

(22) Filed: Mar. 19, 2001

(65) Prior Publication Data
US 2001/0024569 A1    Sep. 27, 2001

(30) Foreign Application Priority Data
Mar. 17, 2000   (JP)   ............. 2000-075789

(51) Int. Cl.
H04N 5/917 (2006.01)

(52) U.S. Cl. .................. 386/111; 375/240.23

(58) Field of Classification Search ............ 386/35, 386/46, 109, 111, 112, 123, 124; 360/32, 360/48, 49; 375/240.03, 240.04, 240.05, 375/240.23
See application file for complete search history.

(56) References Cited

U.S. PATENT DOCUMENTS 5,557,479 A * 9/1996 Yanagihara .............. 360/32
5,594,598 A * 1/1997 Shikakura ................ 360/49
5,654,760 A * 8/1997 Ohtsuki ............. 375/240.04
5,751,359 A   5/1998 Suzuki et al.
5,809,200 A * 9/1998 Nishimoto et al. ......... 386/46
6,944,226 B1   9/2005 Lin et al.

FOREIGN PATENT DOCUMENTS

| EP | 0 601 878 A | 6/1994 |
|----|----|----|
| EP | 0 786 905 A | 7/1997 |
| EP | 1 033 833 A1 | 9/2000 |
| JP | 06-334983 | 12/1994 |
| JP | 2000-165879 | 6/2000 |

OTHER PUBLICATIONS

European Search Report for EP 01 10 6725, dated Mar. 15, 2004.
"ITU-T Recommendation H.262, International Standard ISO/IEC 13818.2 MPEG-2 Video. Transmission Of Non-Telephone Signals, Information Technology—Generic Coding Of Moving Pictures And Associated Audio Information: Video", ITU-T Telecommunication Standardization Sector of ITU, Geneva, CH, Jul. 1, 1995, pp. 1-211.

(Continued)

*Primary Examiner*—James J. Groody
*Assistant Examiner*—Christopher Onuaku
(74) *Attorney, Agent, or Firm*—RatnerPrestia

(57) ABSTRACT

A signal recording apparatus includes a quantizer for quantizing a signal employing a quantization step. The apparatus further includes a quantization information creator for creating plural pieces of quantization information to specify the quantization step, an encoder for generating an encoded signal from the quantized signal, and a recorder for recording a compressed signal having data containing the plural pieces of quantization information and the encoded signal.

18 Claims, 9 Drawing Sheets

OTHER PUBLICATIONS

"Proposed SMPTE Standard for Television Digital Recording—12.65-MM Type D-9 Component Format-Video Compression-525/60 and 625/50", SMPTE Journal, SMPTE Inc., vol. 108, No. 6, Jun. 1999, pp. 406-445.

Uchida, et al., "DVCPRO: A Comprehensive Format Overview", SMPTE Journal, SMPTE Inc., vol. 105, No. 7, Jul. 1, 1996, pp. 406-418.

European Search Report for EP 01 10 6725, dated Aug. 11, 2004.

Eleftheriadis, A, et al.: "Constrained and General Dynamic Rate Shaping of Compressed Digital Video", Proceedings of the International Conference on Image Processing, Washington, Oct. 23-26, 1995, Los Alamitos, IEEE Comp. Soc. Press, US, vol. 3, Oct. 23, 1995, pp. 396-399.

Japanese Office Action corresponding to application No. 2000-75789 dated Jun. 14, 2005 (w/partial English translation).

* cited by examiner

Fig. 2

| Quantization step | 1 | 2 | 3 | 4 | 5 | 6 | 7 | 8 | 10 | 12 | 14 | 16 | 18 | 20 | 22 | 24 |
|---|---|---|---|---|---|---|---|---|---|---|---|---|---|---|---|---|
| Basic quantization step | 1 | 2 | 3 | 4 | 5 | 6 | 7 | 8 | 5 | 6 | 7 | 16 | 18 | 20 | 22 | 24 |
| Multiplier factor | 1 | 1 | 1 | 1 | 1 | 1 | 1 | 1 | 2 | 2 | 2 | 1 | 1 | 1 | 1 | 1 |

| Quantization step | 28 | 32 | 36 | 40 | 44 | 48 | 52 | 56 | 64 | 72 | 80 | 88 | 96 | 104 | 112 |
|---|---|---|---|---|---|---|---|---|---|---|---|---|---|---|---|
| Basic quantization step | 28 | 16 | 18 | 20 | 22 | 24 | 52 | 28 | 16 | 18 | 20 | 22 | 24 | 52 | 28 |
| Multiplier factor | 1 | 2 | 2 | 2 | 2 | 2 | 1 | 2 | 4 | 4 | 4 | 4 | 4 | 2 | 4 |

Fig. 3

| Basic quantization step | 1 | 2 | 3 | 4 | 5 | 6 | 7 | 8 | 16 | 18 | 20 | 22 | 24 | 28 | 52 |
|---|---|---|---|---|---|---|---|---|---|---|---|---|---|---|---|
| Quantization number | 1 | 2 | 3 | 4 | 5 | 6 | 7 | 8 | 9 | 10 | 11 | 12 | 13 | 14 | 15 |

Fig. 4

| Multiplier factor | 1 | 2 | 4 |
|---|---|---|---|
| Multiplier factor information | 0 | 1 | 2 |

Fig. 7 (a)

Input signal (12 bits) : s b11 b10 b9 b8 b7 b6 b5 b4 b3 b2 b1

Fig. 7 (b)

| D-range | Output signal (9 bits) | Multiplier factor |
|---|---|---|
| 0 ~ 255 | s b8 b7 b6 b5 b4 b3 b2 b1 | $2^0$ |
| 256 ~ 511 | s b9 b8 b7 b6 b5 b4 b3 b2 | $2^1$ |
| 512 ~ 1023 | s b10 b9 b8 b7 b6 b5 b4 b3 | $2^2$ |
| 1024 ~ 2047 | s b11 b10 b9 b8 b7 b6 b5 b4 | $2^3$ |

SIGNAL RECORDING APPARATUS AND METHOD, SIGNAL REPRODUCING APPARATUS AND METHOD, MEDIUM, AND INFORMATION ASSEMBLY

BACKGROUND OF THE INVENTION

1. Field of the Invention

The present invention relates to a signal recording apparatus and method, a signal reproducing apparatus and method, a medium, and an information assembly.

2. Description of the Related Art

As the high efficient encoding system employing the VLC (Variable Length Coding) or DCT (Discrete Cosine Transform), the DVCPRO (trade name, defined in SMPTE314M as the compression method) or the MPEG (Moving Picture Experts Group) compression is provided, but the details of these compression methods are different. For example, in order to convert a DVCPRO bit stream into an MPEG bit stream, it was necessary that the DVCPRO bit stream is once uncompressed to restore the image data, which is then MPEG compressed again.

However, with the above method, since the DVCPRO bit stream is once uncompressed to restore the image data, which is then MPEG compressed again, the video signal is compressed twice, resulting in a problem that the image quality is degraded inevitably.

On the contrary, the present inventor proposed a conversion method which is able to convert a bit stream subjected to the DVCPRO compression to an MPEG bit stream, only by employing the bit stream conversion (refer to Japanese Patent Laid-Open No. 2000-165879). However, the present inventor found a problem that the number of quantization steps may be sometimes extended to implement a compression method which is capable of such bit stream conversion, in which case the conventional compression method can not be employed.

SUMMARY OF THE INVENTION

In view of the above-mentioned problems, it is an object of the invention to provide a signal recording apparatus and method which can implement a compression method capable of expanding the number of quantization steps, a signal reproducing apparatus and method which can reproduce a signal compressed in accordance with the compression method, a medium, and an information assembly.

One aspect of the present invention is a signal recording apparatus, comprising:

quantization means of quantizing a signal employing a quantization step;

quantization information creating means of creating plural pieces of quantization information to specify said quantization step;

encoding means of generating an encoded signal from said quantized signal; and recording means of recording a compressed signal having data containing said plural pieces of quantization information and said encoded signal.

Another aspect of the present invention is the signal recording apparatus wherein said quantization step is a product of a basic quantization step and a multiplier factor to be combined with said basic quantization step, and said data is a quantization number for specifying said basic quantization step and the multiplier factor information for specifying said multiplier factor to be combined with said basic quantization step.

Still another aspect of the present invention is the signal recording apparatus wherein said quantization step is uniform in a macro block comprised of DCT blocks, said quantization number is recorded for each said macro block, and said multiplier factor information is recorded for each said DTC block.

Yet another aspect of the present invention is the signal recording apparatus further comprising range conversion means of range converting said quantized signal using a range conversion multiplier factor which is represented as the power of 2, wherein said data had the information regarding said range conversion multiplier factor.

Still yet another aspect of the present invention is the signal recording apparatus wherein said quantization step is a product of a basic quantization step and a multiplier factor to be combined with said basic quantization step, and said plural pieces of quantization information are a quatization number for specifying said basic quantization step and the multiplier factor information for specifying said multiplier factor to be combined with said basic quantization step, wherein the information involving the range conversion multiplier factor means the overall multiplier factor information consisting of the information regarding the range conversion multiplier factor and the information on the basis of said multiplier factor information.

A further aspect of the present invention is the signal recording apparatus wherein the multiplier factor to be combined with said basic quantization step is the power of 2, said multiplier factor information being the power exponent, and said overall multiplier factor information is a sum of its power exponent and the power exponent of the range conversion multiplier factor represented as the power of 2.

A still further aspect of the present invention is the signal recording apparatus wherein said quantization step is uniform in a macro block comprised of DCT blocks, said quantization number is recorded for each said macro block, and said sum is recorded for each said DTC block.

A yet further aspect of the present invention is the signal recording apparatus wherein said signal has 12 bits, said range converted signal has 9 bits, and said overall multiplier factor information had 2 bits or less.

A still yet further aspect of the present invention is a signal recording method, comprising the steps of:

quantizing a signal employing a quatization step;

creating plural pieces of quantization information to specify said quantization step;

generating an encoded signal from said quantized signal; and recording a compressed signal having data containing said plural pieces of quantization information and said encoded signal.

A further aspect of the present invention is a signal reproducing apparatus, comprising:

reproduction means of reproducing the data containing plural pieces of quantization information for specifying a quantization step used in quantizing the signal and an encoded signal to be generated from said quantized signal from a compressed signal recorded as a signal having the data and said encoded signal;

quantization step configuration means of configuring a quantization step on the basis of plural pieces of said reproduced quantiztion information; and inverse quantization means of making the inverse quantization in accordance with said configured quantization step on the basis of said reproduced encoded signal.

An additional aspect of the present invention is the signal reproducing apparatus wherein said quantized signal is range converted using a range conversion multiplier factor which is represented as the power of 2, and said data has the information regarding said range conversion multiplier factor, said signal reproducing apparatus comprising inverse range conversion means of making the inverse range conversion on the basis of said encoded signal and the information regarding said range conversion multiplier factor, said inverse quantization in accordance with said configured quantization step being effected for said signal which has undergone the inverse range conversion on the basis of said encoded signal.

A still additional aspect of the present invention is the signal reproducing apparatus wherein said quantization step used in quantizing the signal is a product of a basic quantization step and a multiplier factor to be combined with said basic quantization step, and said plural pieces of quantization information is a quantization number for specifying said basic quantization step and the multiplier factor information for specifying said multiplier factor to be combined with said basic quantization step, wherein the information involving said range conversion multiplier factor means the overall multiplier factor information consisting of the information regarding its range conversion multiplier factor and the information of the basis of said multiplier factor information.

A yet additional aspect of the present invention is the signal reproducing apparatus wherein the multiplier factor to be combined with said basic quantization step is the power of 2, said multiplier factor information being the power exponent, and said overall multiplier factor information is a sum of its power exponent and the power exponent of the range conversion multiplier factor represented as said power of 2.

A still yet additional aspect of the present invention is the signal reproducing apparatus wherein said quantization step used in quantizing said signal is uniform in a macro block composed of DCT blocks, said quantization number is recorded for each said macro block, and said sum is recorded for each said DTC block.

A supplementary aspect of the present invention is the signal reproducing apparatus wherein said quantization step configured is a product of a not greater value among the minimum value of the sums recorded for said DCT blocks within said macro block and the maximum value which the multiplier factor information for specifying the multiplier factor to be combined with the basic quantization step can take, and a quantization number recorded for each said macro block.

A still supplementary aspect of the present invention is a signal reproducing method, comprising the steps of:

reproducing the data containing plural pieces of quantization information for specifying a quantization step used in quantizing a signal and an encoded signal to be generated from said quantized signal from a compressed signal recorded as a signal having the data and said encoded signal;

configuring the quantization step on the basis of plural pieces of said quantization information reproduced; and making the inverse quantization in accordance with said configured quantization step on the basis of said reproduced encoded signal.

A yet supplementary aspect of the present invention is a medium for carrying a program and/or the data for enabling a computer to execute all or some functions provided for means in whole or part of the invention wherein said medium can be processed by said computer.

A still yet supplementary aspect of the present invention is a medium for carrying a program and/or the data for enabling a computer to execute all or some operations provided for steps in whole or part of the invention wherein said medium can be processed by said computer.

Another aspect of the present invention is an information assembly which is a program and/or the data for enabling a computer to execute all or some functions provided for means in whole or part of the invention.

Still another aspect of the present invention is an information assembly which is a program and/or the data for enabling a computer to execute all or some operations provided for steps in whole or part of the invention.

BRIEF DESCRIPTION OF THE DRAWINGS

FIG. 2 is a table for effecting a quantization step conversion in the embodiment of the invention (two tables are provided on account of space consideration);

FIG. 3 is a table for effecting a basic quantization number conversion in the embodiment of the invention;

FIG. 4 is a table for effecting a multiplier factor conversion in the embodiment of the invention;

FIG. 7A is an explanatory view for explaining an input signal which is to be D-range converted in the embodiment of the invention.

FIG. 7B is an explanatory view for explaining an output signal which has been D-range converted in the embodiment of the invention;

DESCRIPTION OF SYMBOLS

Figure 1:
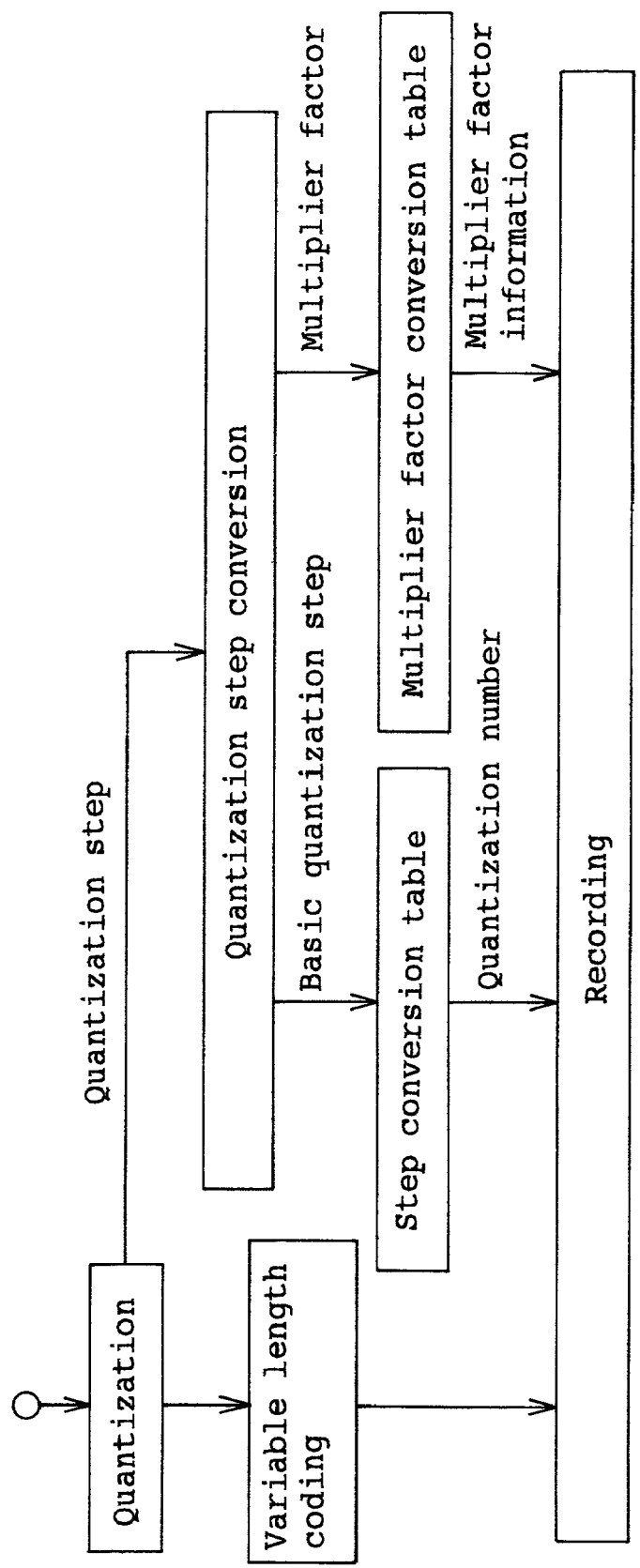
FIG. 1 is an explanatory view for explaining an embodiment of the present invention.

501, 801 Input terminal
502, 802 Blocking unit
503, 803 Orthogonal transformation unit
504, 804 Quantizer
505, 806 Variable length encoder
506, 807 Quantization step converter
507, 809 Formatter
508, 810 Recorder
509, 811, 1011 Magnetic tape
805 D-range converter
808 Adder
1001 Output terminal
1002 Inverse blocking unit 1003 Inverse orthogonal transformation unit
1004 Inverse quantizer
1005 D-range expander
1006 Variable length decoder
1007 Quantization step creating unit
1008 Minimum multiplier factor information detector
1009 Inverse formatter
1010 Reproducer

DETAILED DESCRIPTION OF THE PREFERRED EMBODIMENTS

The present inventor proposed a conversion method which is able to convert a bit stream subjected to the DVCPRO compression to an MPEG bit stream, for example, only by employing the bit stream conversion, as described before (refer to Japanese Patent Laid-Open No. 11-264521). To implement the compression method capable of such bit stream conversion, it is often required to increase the number of quantization steps or the effective number of bits for the AC component after quantization. However, if they are simply increased, the data cannot be recorded in accordance with the conventional compression method.

Thus, the present inventor invented a new compression method capable of bit stream conversion as previously described, and a new reproduction method for reproducing a signal compressed in accordance with such compression method. These compression and reproduction methods will be described below with reference to the drawings.

(Embodiment 1)

Referring now to FIGS. 1 to 4, a video signal recording method according to an embodiment 1 of the invention will be described below. FIG. 1 is an explanatory view for explaining the video signal recording method according to the embodiment 1. In this embodiment, it is assumed that the number of quantization steps that allows for the recording is 15 kinds, as represented in terms of four bits, and the number of quantization steps for use in the quantization is 31 kinds, as represented in terms of five bits.

As shown in FIG. 1, an input signal is quantized, and a quantized signal and a quantization step used in the quantization, are output as the data. Normally, the quantized signal is variable length encoded and recorded together with the quantization step used, but because a greater number of quantization steps are used in this embodiment, they can not recorded directly. Therefore, the number of steps is reduced from 31 kinds to 15 kinds, employing the following method.

That is, the quantization step used in the quantization is divided into a basic quantization step and a multiplier factor, employing a table as shown in FIG. 2 (two tables are provided on account of space consideration). For example, if the quantization step used is 72, the basic quantization step is 18 and the multiplier factor is 4.

Then, the basic quantization step is converted into the quantization number, employing a table as shown in FIG. 3, and the multiplier factor is converted into the multiplier factor information, employing a table-as shown in FIG. 4. In the above example, the quantization step 18 and the multiplier factor 4 are converted into the quantization number 10 and the multiplier factor information 2, respectively.

The quantization number and the multiplier factor information as obtained in this way are recorded together with the data obtained by variable length encoding the quantized signal.

Note that the location for recording the multiplier factor information as shown in the embodiment 1 is arbitrary. For example, it may be a location for recording the class information in a unit of DCT block in the DVCPRO compression, which is unnecessary to implement a compression method for creating a DVCPRO bit stream which can be bit stream converted into an MPEG bit stream, as explained in this embodiment (in this case, the multiplier factor itself may be recorded instead of the multiplier factor information). Of course, in the previous case, the location for recording the quantization number of MPEG bit stream may be, for example, the location at which the quantization number of the original MPEG bit stream has been recorded. In this way, the number of quantization steps can be extended by recording the quantization number corresponding to the basic quantization step for determining the quantization step and the multiplier factor information indicating the multiplier factor.

Note that if the multiplier factor information is recorded in a unit of DCT block, it is possible to limit the range of an error within a DCT block where the error has occurred, even when the error has occurred in the multiplier factor information recorded.

If the quantization step is divisible, as described above, the information required for the quantization is increased by the amount of multiplier factor (e.g., if each of 31 quantization steps is represented in terms of four bits, 4×31=124 bits are required in the embodiment 1, but the quantization step is divided as above described, 4×15(basic quantization step)+4×3(multiplier factor)=72 bits are only required). Accordingly, in the case where a quantization table containing the elements of quantization steps is defined, it is possible to suppress the increasing amount of information.

The quantization step, the basic quantization step, the multiplier factor, the quantization number, and the multiplier factor information as employed in the embodiment 1 and shown in FIGS. 2 to 4 are only illustrative. In brief, the quantization step for use may be a multiplication of the basic quantization step and the multiplier factor.

If the quantization step used in the quantization is converted into the quantization number and multiplier factor information which are recordable, as described above, the number of quantization steps for use in the quantization can be extended.

(Embodiment 2)

Figure 5:
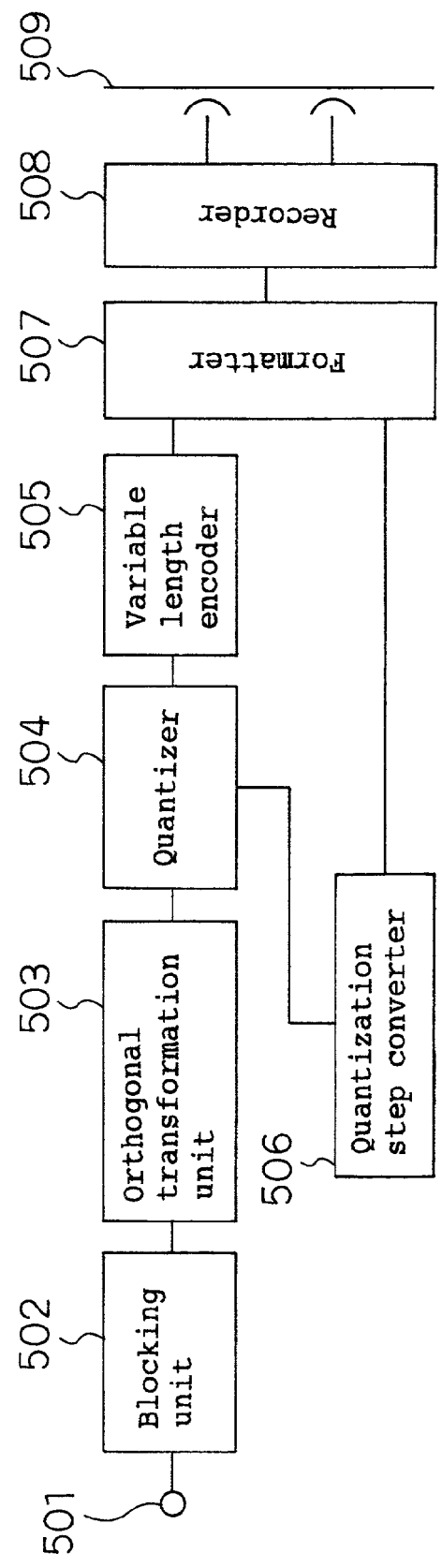
FIG. 5 is a block diagram for explaining an embodiment 2 of the invention.

Referring now to FIG. 5, the configuration of a video signal recording apparatus in an embodiment 2 will be described below. FIG. 5 is a block diagram for explaining the configuration of the video signal recording apparatus in the embodiment 2. In this embodiment, it is assumed that the recordable number of quantization steps is 15 kinds as represented in terms of four bits, and the number of quantization steps for use in the quantization is 31 kinds as represented in terms of five bits.

In FIG. 5, reference numeral 501 denotes an input terminal for inputting a video signal, reference numeral 502 denotes a blocking unit for dividing the input signal into blocks, reference numeral 503 denotes an orthogonal transformation unit for making the discrete cosine transform of the input video signal, reference numeral 504 denotes a quantizer for quantizing the video signal which has undergone the discrete cosine transform, reference numeral 505 denotes a variable length encoder for variable length encoding the quantized video signal, reference numeral 506 denotes a quantization step converter for converting the quantization step used in the quantization, reference numeral 507 denotes a formatter for transforming the input signal into the recordable data format, reference numeral 508 denotes a recorder for recording the input signal, and reference numeral 509 denotes a magnetic tape.

The quantizer 504 corresponds to quantization means of the invention; the quantization step converter 506 corresponds to quantization information creating means of the invention; variable length encoder 505 corresponds to encoding means of the invention; and means comprising the formatter 507 and the recorder 508 corresponds to recording means of the invention.

Referring to FIG. 5 again, the operation of the video signal recording apparatus in this embodiment 2 will be described below.

The blocking unit 502 divides a video signal input via the input terminal 501 into DCT blocks, and builds up a macro block by collecting a plurality of DCT blocks. The orthogonal transformation unit 503 performs the discrete cosine transform for the DCT blocks within the macro block for output to the quantizer 504.

The quantizer 504 quantizes an alternating current component of a DCT block having undergone the discrete cosine transform within the macro block, which is an input signal, employing any quantization step among 31 kinds of quantization steps as shown in FIG. 2, and outputs the quantized signal to the variable length encoder 505 and the quantization step used to the quantization step converter 506, respectively.

The quantization step converter 506 obtains the quantization number and the multiplier factor information from the input quantization step, employing the method as explained in the embodiment 1, and outputs them to the formatter 507. Also, the variable length encoder 505 applies the variable length coding to the alternating current component of the input signal for output to the formatter 507.

The formatter 507 converts the direct current component of the input DCT block within the macro block which has undergone the discrete cosine transform, the alternating current component which is variable length encoded, the quantization number, and the multiplier factor information into the data format for recording and outputs them to the recorder 508.

The recorder 508 records the input signal on the magnetic tape 509.

As described above, the quantization step converter 506 converts the quantization step used in the quantization into the quantization number and the multiplier factor information which are recordable. In this way, the quantization step for use in the quantization can be extended. Also, by recording the multiplier factor information in a unit of DCT block, as previously described, it is possible to limit the range of an error within a DCT block where the error has occurred, even when the error has occurred in the recorded multiplier factor information.

In the embodiment 2, the location at which the multiplier factor information is recorded is also arbitrary. The multiplier factor itself may be recorded. The quantization step, the basic quantization step, the multiplier factor, the quantization number, and the multiplier factor information are only illustrative, as in the embodiment 1, and may take different values.

The extension in this embodiment 2 is effective not only to the magnetic tape, but also to the data on the digital interface, which is output to the formatter 507.

(Embodiment 3)

Figure 6:
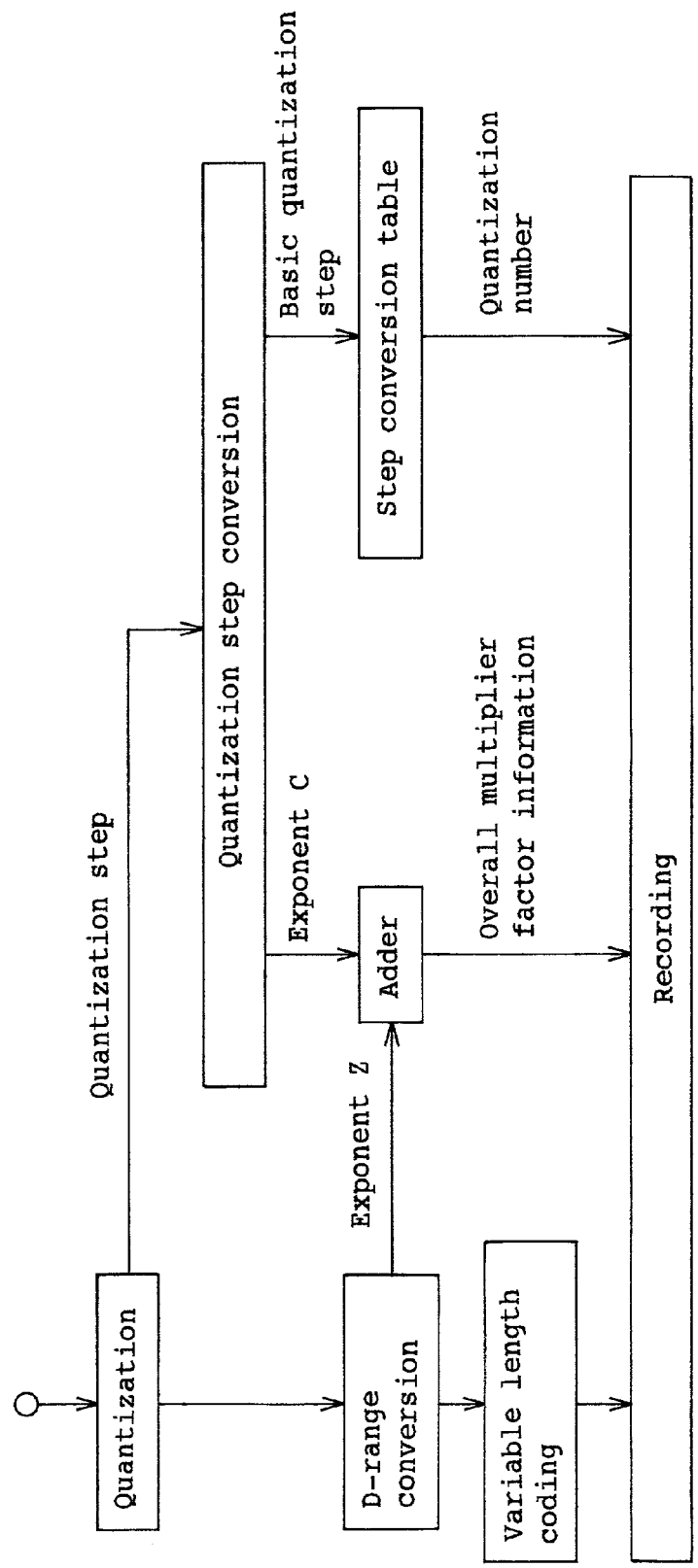
FIG. 6 is an explanatory view for explaining an embodiment 3 of the invention.

Referring now to FIGS. 6 and 7, a video signal recording method according to an embodiment 3 of the invention will be described below. FIG. 6 is an explanatory view for explaining the video signal recording method according to the embodiment 3. In this embodiment, it is assumed that the recordable number of quantization steps is 15 kinds as represented in terms of four bits, and the number of quantization steps for use in the quantization is 31 kinds as represented in terms of five bits. It is also assumed that the bit precision of the AC component capable of variable length coding is nine bits, and the output of quantization is twelve bits.

In FIG. 6, an input signal is quantized, and the quantized signal, and the quantization step used in the quantization are output as the data. In this embodiment 3, the quantization step used can not be recorded directly owing to the same reason as in the embodiment 1.

Therefore, the number of quantization steps is reduced from 31 kinds to 15 kinds, with reference to FIGS. 2 and 3, owing to the same method as in the embodiment 1. In this embodiment 3, to record in combination with the multiplier factor taking place in making a D-range (dynamic range) transformation as will be described later, the multiplier factor introduced to record the quantization step is represented by 2 to the C-th power (the multiplier factor in FIG. 2 is already set to 2 to the C-th power and may be used directly). Herein, when the quantization step of FIG. 2 is used, the value of C takes three kinds, 0, 1 and 2.

The D-range conversion will be described below. In this embodiment 3, the bit precision of the AC component capable of variable length coding is nine bits, and the quantized output is twelve bits, as previously described.

An input signal with an effective bit number of twelve bits has an effective bit number of twelve bits after being quantized. However, since the effective bit number which can be treated with the variable length coding in this embodiment is nine bits, it is required that the effective number bit of the quantized input signal is reduced from twelve bits to nine bits.

Thus, the D-range conversion in a unit of DCT block will be performed employing an explanatory view of FIG. 7. FIG. 7A is an explanatory view of the input signal which will undergo the D-range conversion, and FIG. 7B is an explanatory view of an output signal which has undergone the D-range conversion.

That is, for the quantized input signal, the D-range (absolute value excluding the sine bits (see FIG. 7)) within each DCT block is first calculated, and the input signal of twelve bits is transformed into the data of nine bits and the multiplier factor by deleting upper bits and lower bits, depending on this value of D-range, as shown in FIG. 7.

Herein, the value of 2 to the Z-th power is produced as the multiplier factor, in proportion to the number of bits in deleted lower bits. Note that the Z value takes four kinds, 0, 1, 2 and 3 in the conversion from twelve bits to nine bits in this embodiment.

Thus, the overall multiplier factor information in the embodiment 3 is obtained by adding this Z and an power exponent (coefficient) C of a multiplier factor represented as the power of 2 as explained in the embodiment 1. As shown in FIG. 2, the value of C is equal to 1 or 2 when the quantization step is 10 or greater (see FIG. 2). At this time, since it can be considered that the effective bit number of the quantized input signal is within nine bits, the value of Z is always equal to zero (see FIG. 7), and the overall multiplier factor information which is a sum of Z and C is either 1 or 2. As shown in FIG. 2, when the quantization-step is 8 or less, the value of C is always zero, whereas the overall multiplier factor information which is a sum of Z and C is equal to 0, 1, 2 or 3 in this case (because the value of Z is 3 at maximum, when the quantization step is 1; the value of Z is 2 at maximum, when the quantization step is 2; the value of Z is 1 at maximum, when the quantization step is 4; and the value of Z is always zero, when the quantization step is 8). In effect, the overall multiplier factor information is 0, 1, 2 or 3, and can be represented in terms of within two bits.

Accordingly, by introducing the MPEG compression, for example, the overall multiplier factor information can be recorded in two bits of the class information in a unit of DCT block which is not employed in the DVCPRO compression as explained in this embodiment (refer to Japanese Patent Laid-Open No. 11-264521). For example, the quantization number as represented (see FIG. 3) by any number of 1 to 15 can be recorded in four bits where the quantization number of the DVCPRO compression is recorded, and the quantization number corresponding to the basic quantization step for determining the quantization step and the overall multiplier factor information indicating the multiplier factor is recorded, whereby the number of quantization steps and the effective bit number of the AC component after quantization can be extended in the same recording format as that of the DVCPRO compression as explained in this embodiment.

In this way, the overall multiplier factor information and the quantization number are recorded together with the data obtained by variable length coding the video signal which has been D-range converted. In this embodiment, since the D-range conversion is performed in a unit of DCT block, the overall multiplier factor information is also recorded in a unit of DCT block.

As described above, the quantization step used in the quantization is converted into the quantization number and the multiplier factor which are recordable. Further, the quantized signal is converted into the data with a smaller effective bit number and the multiplier factor by the D-range conversion, and the overall multiplier factor information obtained by adding these two kinds of multiplier factors is recorded, whereby changes of the number of quantization step used in the quantization and the dynamic range of the quantized data can be made.

In this embodiment, the D-range extension is performed in a unit of DCT block, but may be made in a unit of macro block. In this case, the overall multiplier factor information is recorded in a unit of DCT block, whereby it is possible to limit the range of an error within a DCT block where the error has occurred, even if the error has occurred in the overall multiplier factor information recorded.

In the embodiment 3, the location at which the overall multiplier factor information is recorded is also arbitrary. The multiplier factor (i.e., 2 to the power of the overall multiplier factor information) itself may be recorded. The quantization step, the basic quantization step, the multiplier factor, the quantization number, and the overall multiplier factor information are only illustrative, as in the embodiment 1, and may take different values. In effect, the quantization step used may be a multiplication of the basic quantization step and the multiplier factor.

(Embodiment 4)

Figure 8:
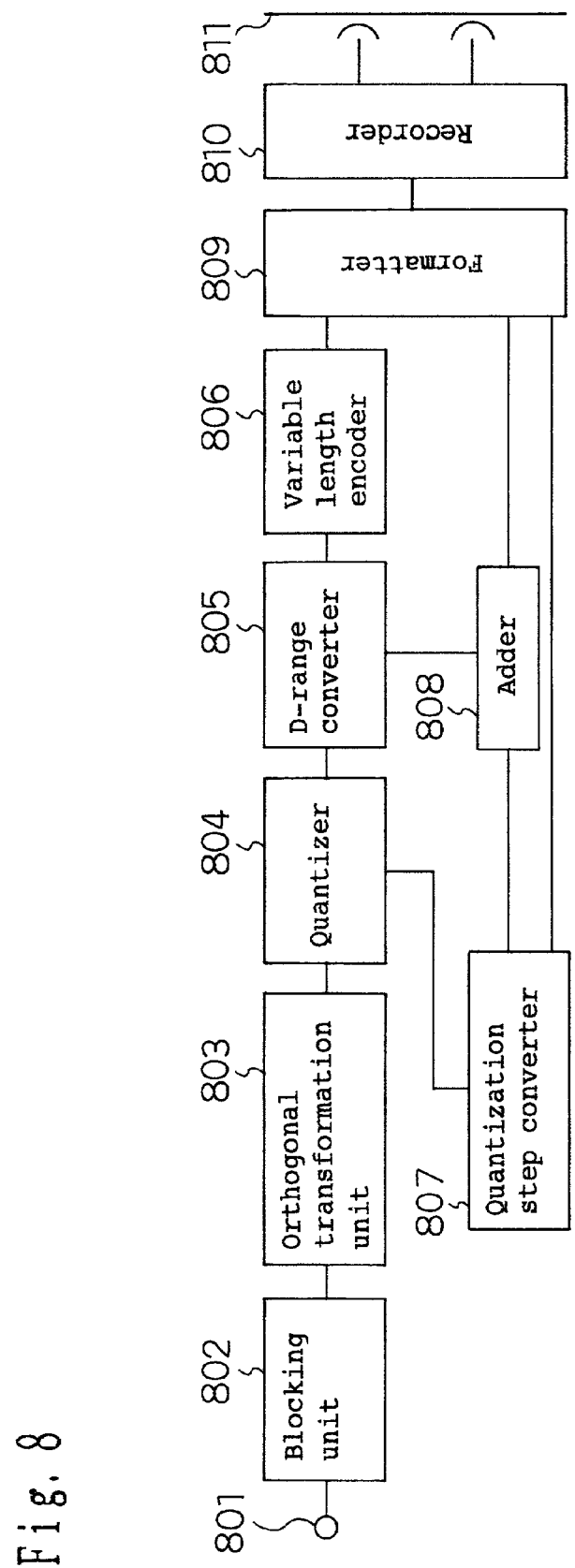
FIG. 8 is a block diagram for explaining an embodiment 4 of the invention.

Referring now to FIG. 8, the configuration of a video signal recording apparatus in an embodiment 4 will be described below. FIG. 8 is a block diagram for explaining the configuration of the video signal recording apparatus in the embodiment 4. In this embodiment, it is assumed that the recordable number of quantization steps is 15 kinds as represented in terms of four bits, and the number of quantization steps for use in the quantization is 31 kinds as represented in terms of five bits. The bit precision of the AC component capable of variable length coding is nine bits, and the output of quantization is twelve bits.

In FIG. 8, reference numeral 801 denotes an input terminal for inputting a video signal, reference numeral 802 denotes a blocking unit for dividing the input signal into blocks, reference numeral 803 denotes an orthogonal transformation unit for making the discrete cosine transform of an input video signal, reference numeral 804 denotes a quantizer for quantizing the video signal which has undergone the discrete cosine transform, reference numeral 805 denotes a D-range converter for making the D-range conversion for the quantized signal, reference numeral 806 denotes a variable length encoder for variable length coding the video signal which has been D-range converted, reference numeral 807 denotes a quantization step converter for converting the quantization step used in the quantization, reference numeral 808 denotes an adder for adding the signal produced by the quantization step conversion and the signal produced by the D-range conversion, reference numeral 809 denotes a formatter for converting the input signal into the recordable data format, reference numeral 810 denotes a recorder for recording the input signal, and reference numeral 811 denotes a magnetic tape.

The quantizer 804 corresponds to quantization means of the invention; the D-range converter 805 corresponds to the range converting means of the invention; means comprising the quantization step converter 807 and the adder 808 corresponds to quantization information creating means of the invention; variable length encoder 806 corresponds to encoding means of the invention; and means comprising the formatter 809 and the recorder 810 corresponds to recording means of the invention.

Referring to FIG. 8 again, the operation of the video signal recording apparatus in this embodiment 4 will be described below.

The blocking unit 802 divides a video signal input via the input terminal 801 into DCT blocks, and builds up a macro block by collecting a plurality of DCT blocks. The orthogonal transformation unit 803 performs the discrete cosine transform for the DCT blocks within the macro block, and outputs the transformed DCT blocks to the quantizer 804.

The quantizer 804 quantizes an alternating current component of DCT blocks having undergone the discrete cosine transform within the macro block, which is the input signal, employing any quantization step among 31 kinds of quantization steps as shown in FIG. 2, and outputs the quantized signal to the D-range converter 805 and the quantization step used to the quantization step converter 807, respectively.

The quantization step converter 807 calculates the quantization number and the power exponent (coefficient) C of the multiplier factor as represented in the C-th power of 2 from the input quantization step, employing the method explained in the embodiment 3, and outputs the quantization number to the formatter 809, and the value of C to the adder 808, respectively.

The D-range converter 805 converts an alternating current component of the input signal for output to the variable length encoder 806, employing a method as explained in the embodiment 3, and calculates the value of the power exponent (coefficient) Z of the multiplier factor for output to the adder 808.

The adder 808 calculates a sum of C and Z which are input, and outputs the sum to the formatter 809. Also, the variable length encoder 806 applies the variable length coding to the alternating current component of the input signal which has undergone the D-range conversion and outputs the encoded alternating current component to the formatter 809.

The formatter 809 transforms the direct current component of input DCT block within the macro block which has undergone the discrete cosine transform, the alternating current component which has undergone the variable length coding, the quantization number, and the multiplier factor information into the data format for recording and outputs them to the recorder 810.

The recorder 810 records the input signal on the magnetic tape 811. Note that the multiplier factor information is recorded in accordance with the unit used in the D-range extension in this embodiment.

As described above, the quantization step converter 807 transforms the quantization step used in the quantization into the quantization number and the multiplier factor which are recordable. Further, the D-range converter 805 converts the quantized signal into the data with a smaller effective bit number and the multiplier factor by the D-range conversion. The adder 808 creates the overall multiplier factor information obtained by adding these two kinds of multiplier factors. In this way, changes of the number of quantization step used in the quantization and the dynamic range of the quantized data can be made.

In this embodiment 4, the D-range extension is performed in a unit of DCT block, but may be made in a unit of macro block. In this case, the overall multiplier factor information is recorded in a unit of DCT block, whereby it is possible to limit the range of an error within a DCT block where the error has occurred, even if the error has occurred in the overall multiplier factor information recorded.

In the embodiment 4, the location at which the overall multiplier factor information is recorded is also arbitrary. The multiplier factor (i.e., 2 to the power of the overall multiplier factor information) itself may be recorded. The quantization step, the basic quantization step, the multiplier factor, the quantization number, and the overall multiplier factor information are only illustrative, as in the embodiment 3, and may take different values.

The extension in this embodiment 4 is effective not only to the magnetic tape, but also to the data on the digital interface, which is output to the formatter 809.

(Embodiment 5)

Figure 9:
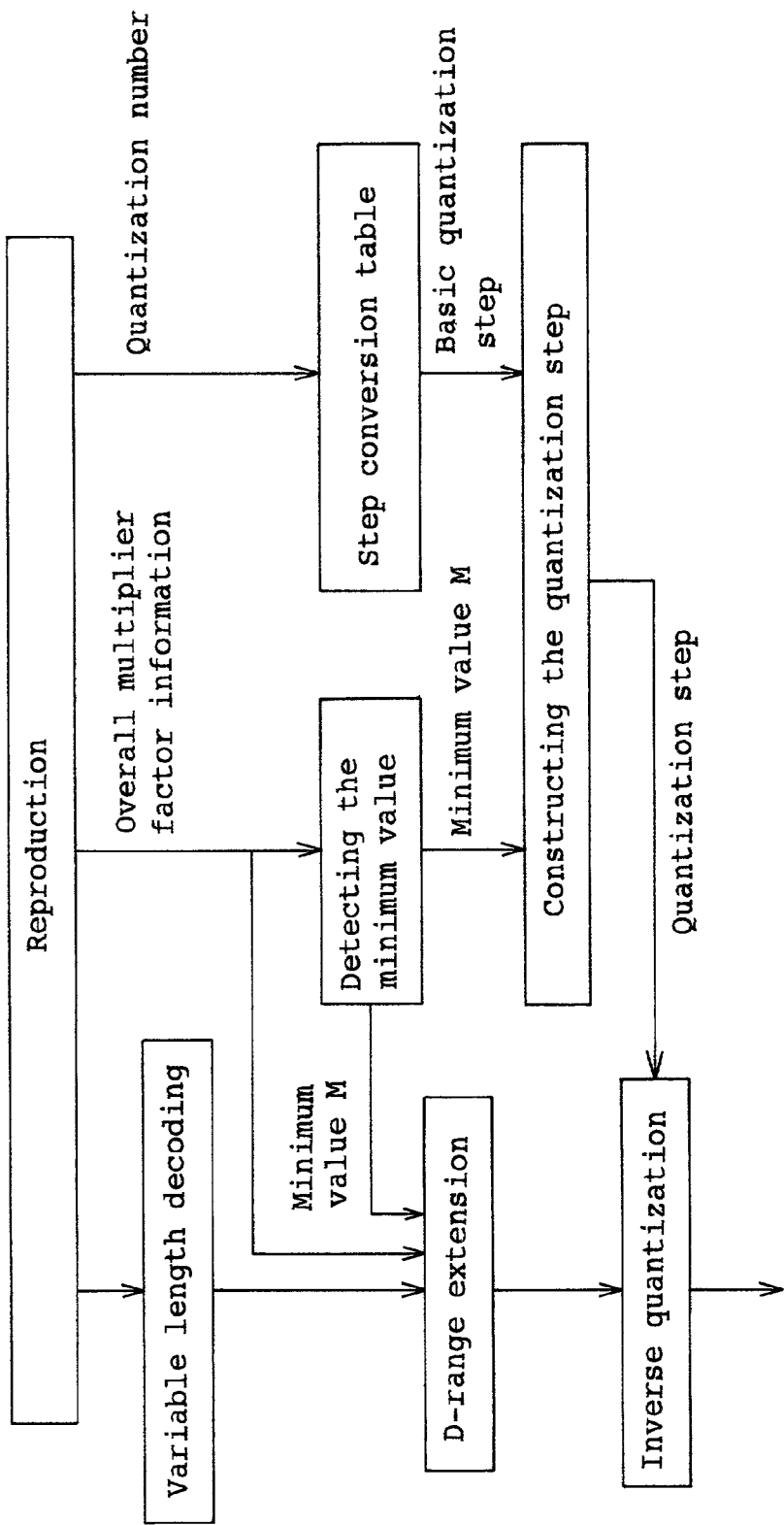
FIG. 9 is an explanatory view for explaining an embodiment 5 of the invention.

Referring to FIG. 9, a video signal reproducing method according to an embodiment 5 will be described below. FIG. 9 is an explanatory view for explaining the video signal reproducing method according to the embodiment 5.

This embodiment 5 involves a new video signal reproducing method for reproducing the signal recorded by quantizing each DCT block within a macro block in the same quantization step, employing the video signal recording method as explained in the embodiments 3 and 4. This signal inversely formatted (reproduced) is composed of a variable length encoded signal, the overall multiplier factor information and the quantization number, as will be described later in the embodiment 6.

Thus, among the minimum value of the overall multiplier factor information C+Z and the maximum value which the multiplier factor information C for specifying the multiplier factor to be combined with the basic quantization step can take, a not greater value M is obtained within the macro block, and the D-range extension and the quantization step configuration are effected, as described below.

That is, the variable length encoded signal is decoded in variable length, and the D-range extension is performed, employing a value subtracted by the value M. Herein, supposing that the effective bit number of the signal decoded in variable length is Y bits, the effective bit number of the signal D-range extended is equal to Y bits×(2 to the (overall multiplier factor information−M)-th power)=X bits.

The quantization number is converted into the basic quantization step with reference to a table of FIG. 3, and the quantization step is configured, employing the value M (i.e., the product of the basic quantization step and the M-th power of 2 is the quantization step) Of course, the inverse quantization of the signal of X bits D-range extended is performed, employing this quantization step.

The inversely quantized signal is subjected to the inverse discrete cosine transform and the inverse blocking, and output as a reproduced signal, as will be described later in the embodiment 6.

As described above, it is possible to reproduce a signal compressed in accordance with a new compression method capable of extending the number of quantization steps.

The reproducing operation with the new video signal reproducing method has been thus described. In the following, explanation will be given of the reason of employing the not greater value M among the minimum value of the overall multiplier factor information and the maximum value which the multiplier factor information for specifying the multiplier factor to be combined with the basic quantization step can take will be described below in connection with an instance of transforming the DVCPRO bit stream into the MPEG bit stream (refer to Japanese Patent Laid-Open No. 11-264521). The overall multiplier factor information is recorded as a sum of the D-range conversion information and the quantization step, as already described in the embodiment 3.

For example, in recording the signal, the overall multiplier factor information is 1 in the cases where in the macro block, (1) the quantization step is 7 (hence C=0) and the exponent (coefficient) Z in the D-range transform is 1, and (2) the quantization step is 14 (hence C=1) (automatically Z=0).

In this embodiment 5, the inverse quantization is made, employing the quantization step of 14 in either case (because the minimum value of the overall multiplier factor is one in either case). On the contrary, a method can be conceived in which the overall multiplier factor information itself (i.e., one) is used to make the D-range extension, and the basic quantization step (i.e., 7) is directly used as the quantization step, unlike this embodiment. Of course, it is possible to employ any of the method of this embodiment and the above method to obtain the same reproduced signal.

Herein, a case will be considered in which the inversely quantized signal as described above is stream transformed into the MPEG stream, without applying the inverse discrete cosine transform and the inverse blocking. Since the variable length coding of MPEG is applied at this time, the code amount can be reduced with the smaller value of AC component in the DCT block. Accordingly, if the reproduced signal is identical, the quantization step should be a greater value, and it is beneficial to make use of a not greater value among the minimum value of the overall multiplier factor information C+Z and the maximum value (herein, 2) which the multiplier factor information C for specifying the multiplier factor to be combined with the basic quantization step can take. This is the reason for using a not greater value M among the minimum value of the overall multiplier factor information and the maximum value which the multiplier factor information for specifying the multiplier factor to be combined with the basic quantization step can take in this embodiment.

As described above, a not greater value M among the minimum value of the overall multiplier factor information and the maximum value which the multiplier factor information for specifying the multiplier factor to be combined with the basic quantization step can take is obtained, and by reflecting its result, the quantization step is configured to be larger, whereby the code amount after the MPEG transcode can be reduced.

(Embodiment 6)

Figure 10:
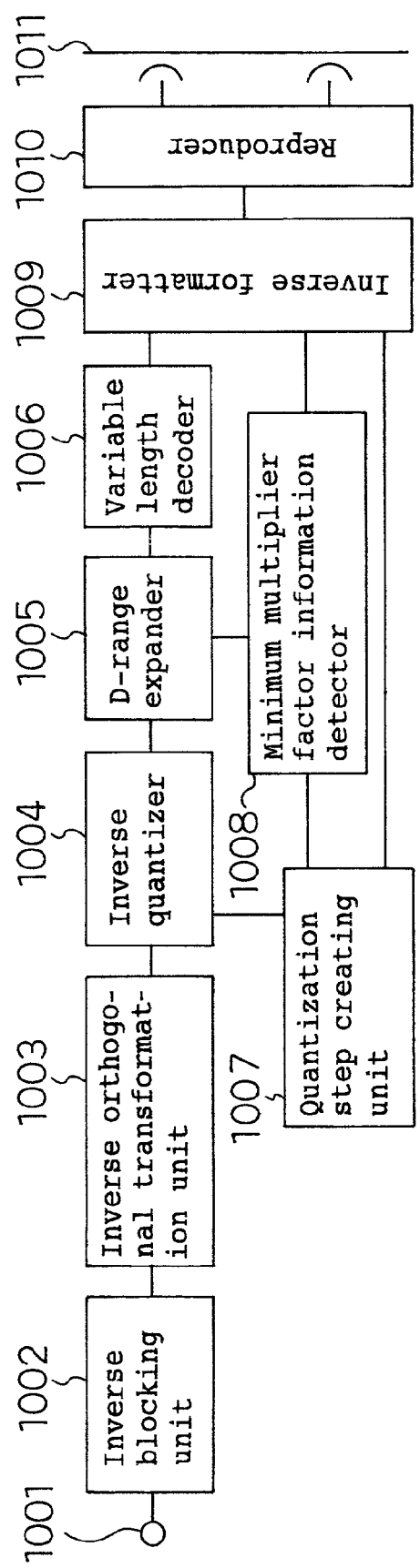
FIG. 10 is a block diagram for explaining an embodiment 6 of the invention.

Referring to FIG. 10, the configuration of a video signal reproducing apparatus will be described below. FIG. 10 is a block diagram for explaining the configuration of the video signal reproducing apparatus according to the embodiment 6. In this embodiment 6, the video signal recording method as explained in the embodiments 3 and 4 is employed to quantize each DCT block within a macro block by using the same quantization step to reproduce a signal.

In FIG. 10, reference numeral 1011 denotes a magnetic tape on which the signal is recorded, reference numeral 1010 denotes a reproducer for reproducing a signal from the magnetic tape, reference numeral 1009 denotes an inverse formatter for inversely formatting the required information from the reproduced signal, reference numeral 1008 denotes a minimum multiplier factor information detector for detecting a minimum value of the overall multiplier factor information that has been input, reference numeral 1007 denotes a quantization step creating unit for creating the quantization step from an input signal, reference numeral 1006 denotes a variable length decoder for variable length decoding the input signal, reference numeral 1005 denotes a D-range extender for extending the D-range of the input signal, reference numeral 1004 denotes an inverse quantizer for inversely quantizing the input signal, reference numeral 1003 denotes an orthogonal transformer for making the inverse discrete cosine transform of the input signal, reference numeral 1002 denotes an inverse blocking unit for unblocking the input signal, and reference numeral 1001 denotes an output terminal for outputting the reproduced signal.

The inverse quantizer 1004 corresponds to inverse quantizing means of the invention; the D-range expander 805 corresponds to inverse range converting means of the invention; means comprising the quantization step creating unit 1007 and the minimum multiplier factor information detector 1008 corresponds to quantization step constructing means of the invention; and means comprising the inverse formatter 1009 and the reproducer 1010 corresponds to reproducing means of the invention.

Referring now to FIG. 10 again, the operation of the video signal reproducing apparatus in the embodiment 6 will be described below.

The reproducer 1010 reproduces the information from the magnetic tape 1011, and outputs the reproduced information to the inverse formatter 1009. The inverse formatter 1009 makes the inverse formatting to reproduce the direct current component, the alternating current component that is variable length encoded, the quantization number, and the overall multiplier factor information from the information reproduced by the reproducer 1010.

The minimum multiplier factor information detector 1008 detects the minimum value of the overall multiplier factor information, employing the method as described in the embodiment 5, and outputs a not greater value among the minimum value of the overall multiplier factor information C+Z and the maximum value which the multiplier factor information C for specifying the multiplier factor to be combined with the basic quantization step can take to the D-range expander 1005 and the quantization step creating unit 1007.

The quantization step creating unit 1007 constructs the quantization step, employing the method as described in the embodiment 5, and outputs the constructed quantization step to the inverse quantizer 1004.

On the other hand, the variable length decoder 1006 variable length decodes the reproduced alternating current component for output to the D-range expander 1005. Also, the D-range expander 1005 D-range extends the alternating current component input from the variable length decoder 1006, employing the method as described in the embodiment 5, for output to the inverse quantizer 1004.

The inverse quantizer 1004 inversely quantizes the alternating current component which is D-range extended by the D-range expander 1005, using the quantization step input from the quantization step creating unit 1007, and outputs this to the inverse orthogonal transformer 1003.

The inverse orthogonal transformer 1003 makes the inverse discrete cosine transform of the alternating current component input from the inverse quantizer 1004 and the direct current component reproduced by the inverse formatter 1009 and input through the same path as the alternating current component, for output to the inverse blocking unit 1002.

The inverse blocking unit 1002 unblocks a blocked signal, and outputs the reproduced signal to the output terminal 1001.

As described above, the minimum multiplier factor information detector 1008 calculates the minimum value of the overall multiplier factor information, and the quantization step creating unit 1007 constructs the quantization step to be greater by reflecting the result. In this way, the code amount after the MPEG transcode can be reduced. In this embodiment, the signal can be decoded without obtaining the minimum value of the overall multiplier factor information. Since the minimum value multiplier factor detector 1008 can be dispensed with in such case of decoding, the configuration of the video signal reproducing apparatus can be simplified.

In the embodiments 1 to 4, the recordable number of quantization steps is 15 kinds as represented in terms of four bits, the number of quantization steps for use in the quantization is 31 kinds as represented in terms of five bits. In the embodiments 3 and 4, the bit precision of the AC component capable of variable length coding is nine bits, and the output of quantization is twelve bits. However, those values are adopted for explanation of the specific example, and the present invention is not limited thereto.

While the multiplier factor to be combined with the basic quantization step of the invention is the power of 2 in the above embodiments, the invention is not limited thereto but may take arbitrary number for such multiplier factor.

In the above embodiment, the overall multiplier factor information is a sum of the power exponent of the multiplier factor to be combined with the basic quantization step which is the power of 2, and the power exponent of the range conversion multiplier factor. However, the invention is not limited thereto, but the overall multiplier factor information may be a pair of the multiplier factor to be combined with the basic quantization step which is not the power of 2 and the range conversion multiplier factor itself, for example.

The quantization step used in the quantization of the signal according to the invention is uniform in the macro block composed of DCT blocks in the above embodiments, but may be different in each DCT block within the macro block, for example.

The quantized signal of the invention is range converted in the above embodiments, but may not be range converted, unless required. In the reproduction of such signal, the inverse range conversion is not necessary to perform, and the signal reproducing apparatus of the invention may not have the inverse range converting means.

A medium for carrying a program and/or the data for enabling a computer to execute all or some functions provided for means in whole or part of the above embodiments is produced, and may be used to enable the computer to perform the above operation in accordance with the read program and/or the data.

An information assembly for carrying a program and/or the data for enabling a computer to execute all or some functions provided for means in whole or part of the above embodiments is produced, and may be used to enable the computer to perform the above operation in accordance with the read program and/or the data structure.

Herein, the data involves the data structure, the data format, and the kind of data. Also, the medium involves the recording medium such as ROM, the transmission medium for the Internet, and the transmission medium for light, radio wave and sound wave. Also, the carrying medium involves the recording medium for recording the program and/or the data, and the transmission medium for transmitting the program and/or the data, for example. To be processable by the computer means to be readable by the computer in the case of the recording medium such as ROM, or to be handleable by the computer as a result of transmitting the program and/or the data in the case of the transmission medium. Also, the information assembly involves the software such as the program and/or the data, for example.

As will be apparent from the above description, the video signal recording method of the invention comprises quantizing an input video signal employing L ($L \leq M \times N$) kinds of quantization steps among M×N kinds of quantization steps of which the values are determined by the multiplication of M kinds ($M \geq 1$) of basic quantization steps and N kinds ($N \geq 1$) of multiplier factors, wherein the quantized signal is variable length encoded, the quantization number corresponding to the basic quantization step for determining the quantization step used in the quantization, the multiplier factor information corresponding to the multiplier factor, and the variable length encoded signal are recorded. Thereby, the number of quantization steps can be extended in the same recording format as employed in the DVCPRO compression.

The video signal recording apparatus of the invention comprises block division means of dividing an input video signal into DCT blocks and constructing a macro block from a plurality of DCT blocks, discrete cosine transform means of discrete cosine transforming each DCT block within the macro block, quantization means of quantizing an alternating current component of DCT block which has undergone the discrete cosine transform employing L ($L \leq M \times N$) kinds of quantization steps among MXN kinds of quantization steps of which the values are determined by the multiplication of M kinds ($M \geq 1$) of basic quantization steps and N kinds ($N \geq 1$) of multiplier factors, quantization information determination means of determining the quantization number corresponding to the basic quantization step and the multiplier factor information corresponding to the multiplier factor for determining the quantization step used in the quantization means, variable length coding means of variable length coding the alternating current signal quantized, and recording means of recording the direct current component of DCT block which has undergone the discrete cosine transform, the alternating current signal which is variable length encoded, the quantization number, and the multiplier factor information. Thereby, this video signal recording apparatus can exhibit the same effect as obtained with the video signal recording method of the invention, as described above.

The video signal recording method of the invention comprises quantizing an input video signal employing L ($L \leq M \times N$) kinds of quantization steps among M×N kinds of quantization steps of which the values are determined by the multiplication of M kinds ($M \geq 1$) of basic quantization steps and N kinds of multiplier factors as represented by 2 to the K-th ($K = 0, 1, 2, \ldots$) power, range converting the quantized signal of X bits into Y ($Y < X$) bits×(2 to the Z-th power ($Z = 0, 1, 2, \ldots$)), variable length coding a Y-bit signal within the range converted signal, and recording the quantization number corresponding to the basic quantization step for determining the quantization step used in the quantization, the overall multiplier factor information corresponding to the sum of the exponent K of multiplier factor and Z obtained in the range conversion, and the variable length encoded signal. Thereby, the effective bit number of the AC component after quantization can be extended.

The video signal recording apparatus of the invention comprises block division means of dividing an input video signal into DCT blocks and constructing a macro block from a plurality of DCT blocks, discrete cosine transform means of discrete cosine transforming each DCT block within the macro block, quantization means of quantizing an alternating current component of DCT block which has undergone the discrete cosine transform employing L ($L \leq M \times N$) kinds of quantization steps among M×N kinds of quantization steps of which the values are determined by the multiplication of M kinds ($M \geq 1$) of basic quantization steps and N kinds of multiplier factors as represented by 2 to the K-th ($K = 0, 1, 2, \ldots$) power to create a quantized alternating current signal having an effective bit number of X bits, range conversion means of converting the quantized alternating current signal of Xbits into Y ($Y < X$) bits×(2 to the Z-th ($Z = 0, 1, 2, \ldots$)), quantization information determination means of determining the quantization number corresponding to the basic quantization step for determining the quantization step used in the quantization and the exponent K of multiplier factor, multiplier factor determination means of determining the overall multiplier factor information by calculating the sum of K and Z, variable length coding means of variable length coding a Y-bit signal within the quantized alternating current signal which has undergone the range conversion, and recording means of recording the direct current component of DCT block which has undergone the discrete cosine transform, the quantized alternating current signal which is variable length encoded, the quantization number, and the overall multiplier factor information. Thereby, this video signal recording apparatus can exhibit the same effect as obtained with the video signal recording method of the invention, as described above.

A video signal reproducing method of the invention for reproducing a video signal recorded in accordance with the video signal recording method of the invention comprises reproducing the variable length encoded signal recorded, the quantization number and the overall multiplier factor information, and making the inverse quantization by variable length decoding the variable length encoded signal, employing the quantization step which is obtained by multiplying the basic quantization step corresponding to the quantization number by (2 to the P-th power) with the coefficient P corresponding to the overall multiplier factor information. Thereby, the signal recorded in accordance with the video signal recording method of the invention can be reproduced. Further, by using the minimum value of the overall multiplier factor information, the signal can be decoded with the reduced code amount transformed into the MPEG bit stream.

A video signal reproducing apparatus of the invention, which for example reproduces a video signal recorded by the video signal recording apparatus of the invention, comprises reproduction means of reproducing the direct current component recorded in a unit of macro block composed of a plurality of DCT blocks, the alternating current component which is variable length encoded, the quantization number and the overall multiplier factor information, variable length decoding means of variable length decoding the alternating current component which is variable length encoded to create an alternating current signal, quantization step determining means of determining the quantization step by calculating the basic quantization step corresponding to the quantization number and the exponent P corresponding to the overall multiplier factor information and multiplying the basic quantization step by (2 to the P-th power), and inverse quantization means of inversely quantizing the alternating current component with the quantization step. Thereby, the video signal reproducing apparatus of the invention can exhibit the same effect as obtained with the video signal reproducing method of the invention.

As described above, the present invention can provide a signal recording apparatus, a signal recording method, a signal reproducing apparatus, a signal reproducing method, a medium, and an information assembly, which are capable of changing a compression method with less degradation of data than conventionally.

As will be clear from the above description, the present invention has the advantage of implementing the compression method which is capable of extending the number of quantization steps.

What is claimed is:

1. A signal recording apparatus, comprising:
   quantization means of quantizing a signal employing a quantization step;
   quantization information creating means of creating plural pieces of quantization information to specify said quantization step;
   encoding means of generating an encoded signal from said quantized signal; and
   recording means of recording a compressed signal having data containing said plural pieces of quantization information and said encoded signal;
   wherein said quantization step is a product of a basic quantization step and a multiplier factor to be combined with said basic quantization step, and
   said data is a quantization number for specifying said basic quantization step and the multiplier factor information for specifying said multiplier factor to be combined with said basic quantization step.

2. The signal recording apparatus according to claim 1, wherein said quantization step is uniform in a macro block comprised of DCT blocks,
   said quantization number is recorded for each said macro block, and
   said multiplier factor information is recorded for each said DCT block.

3. A signal recording apparatus, comprising:
   quantization means of quantizing a signal employing a quantization step;
   quantization information creating means of creating plural pieces of quantization information to specify said quantization step;
   encoding means of generating an encoded signal from said quantized signal;
   recording means of recording a compressed signal having data containing said plural pieces of quantization information and said encoded signal; and
   range conversion means of range converting said quantized signal using a range conversion multiplier factor which is represented as the power of 2,
   wherein said data has the information regarding said range conversion multiplier factor.

4. The signal recording apparatus according to claim 3, wherein said quantization step is a product of a basic quantization step and a multiplier factor to be combined with said basic quantization step, and
   said plural pieces of quantization information are a quantization number for specifying said basic quantization step and the multiplier factor information for specifying said multiplier factor to be combined with said basic quantization step,
   wherein the information involving the range conversion multiplier factor means the overall multiplier factor information consisting of the information regarding the range conversion multiplier factor and the information on the basis of said multiplier factor information.

5. The signal recording apparatus according to claim 4, wherein the multiplier factor to be combined with said basic quantization step is the power of 2, said multiplier factor information being the power exponent,
   and said overall multiplier factor information is a sum of its power exponent and the power exponent of the range conversion multiplier factor represented as the power of 2.

6. The signal recording apparatus according to claim 5, wherein said quantization step is uniform in a macro block comprised of DCT blocks,
   said quantization number is recorded for each said macro block, and
   said sum is recorded for each said DCT block.

7. The signal recording apparatus according to claim 6, wherein said signal has 12 bits,
   said range converted signal has 9 bits, and said overall multiplier factor information has 2 bits or less.

8. A signal reproducing apparatus, comprising:
   reproduction means of reproducing the data containing plural pieces of quantization information for specifying a quantization step used in quantizing the signal and an encoded signal to be generated from said quantized signal from a compressed signal recorded as a signal having the data and said encoded signal;
   quantization step configuration means of configuring a quantization step on the basis of plural pieces of said reproduced quantization information; and
   inverse quantization means of making the inverse quantization in accordance with said configured quantization step on the basis of said reproduced encoded signal;
   wherein said quantized signal is range converted using a range conversion multiplier factor which is represented as the power of 2, said data has the information regarding said range conversion multiplier factor, said signal reproducing apparatus comprising inverse range conversion means of making the inverse range conversion on the basis of said encoded signal and the information regarding said range conversion multiplier factor, and said inverse quantization in accordance with said configured quantization step being effected for said signal which has undergone the inverse range conversion on the basis of said encoded signal.

9. The signal reproducing apparatus according to claim 8, wherein said quantization step used in quantizing the signal is a product of a basic quantization step and a multiplier factor to be combined with said basic quantization step, and said plural pieces of quantization information is a quantization number for specifying said basic quantization step and the multiplier factor information for specifying said multiplier factor to be combined with said basic quantization step, wherein the information involving said range conversion multiplier factor means the overall multiplier factor information consisting of the information regarding its range conversion multiplier factor and the information on the basis of said multiplier factor information.

10. The signal reproducing apparatus according to claim 9, wherein the multiplier factor to be combined with said basic quantization step is the power of 2, said multiplier factor information being the power exponent, and said overall multiplier factor information is a sum of its power exponent and the power exponent of the range conversion multiplier factor represented as said power of 2.

11. The signal reproducing apparatus according to claim 10, wherein said quantization step used in quantizing said signal is uniform in a macro block composed of DCT blocks, said quantization number is recorded for each said macro block, and said sum is recorded for each said DCT block.

12. The signal reproducing apparatus according to claim 11, wherein said quantization step configured is a product of a not greater value among the minimum value of the sums recorded for said DCT blocks within said macro block and the maximum value which the multiplier factor information for specifying the multiplier factor to be combined with the basic quantization step can take, and a quantization number recorded for each said macro block.

13. A method for recording a compressed signal that has been encoded using at least one quantization step from a first set of quantization steps, the method including the steps of:
(a) recording the compressed signal;
(b) reducing the first set of quantization steps into a second set of quantization steps and a third set of multiplier factors,
wherein (1) each quantization step in the first set is a different numerical value within the first set and (2) each quantization step in the second set is a different numerical value within the second set;
(c) configuring the at least one quantization step of the first set by a respective one multiplier factor of the third set and by a respective one quantization step of the second set; and
(d) recording the respective one quantization step and the respective one multiplier factor.

14. The method of claim 13 wherein step (b) includes reducing the quantization steps of the first set into a fewer number of quantization steps of the second set.

15. The method of claim 13 wherein step (c) includes configuring a plurality of quantization steps of the first set, by a respective plurality of multiplier factors of the third set and by a respective plurality of quantization steps of the second set, for encoding the compressed signal.

16. A method for recording a signal, the method including the steps of:
quantizing a signal employing a quantization step;
creating plural pieces of quantization information to specify said quantization step;
generating an encoded signal from said quantized signal; and
recording a compressed signal having data containing said plural pieces of quantization information and said encoded signal;
wherein said quantization step is a product of a basic quantization step and a multiplier factor to be combined with said basic quantization step, and
said data is a quantization number for specifying said basic quantization step and the multiplier factor information for specifying said multiplier factor to be combined with said basic quantization step.

17. A method for recording a signal, the method including the steps of:
quantizing a signal employing a quantization step;
creating plural pieces of quantization information to specify said quantization step;
generating an encoded signal from said quantized signal;
recording a compressed signal having data containing said plural pieces of quantization information and said encoded signal; and
range converting said quantized signal using a range conversion multiplier factor which is represented as the power of 2,
wherein said data has the information regarding said range conversion multiplier factor.

18. A method for recording a signal, the method including the steps of:
reproducing the data containing plural pieces of quantization information for specifying a quantization step used in quantizing the signal and an encoded signal to be generated from said quantized signal from a compressed signal recorded as a signal having the data and said encoded signal;
configuring a quantization step on the basis of plural pieces of said reproduced quantization information; and
making the inverse quantization in accordance with said configured quantization step on the basis of said reproduced encoded signal;
wherein said quantized signal is range converted using a range conversion multiplier factor which is represented as the power of 2,
said data has the information regarding said range conversion multiplier factor,
said recording of a signal comprising making an inverse range conversion on the basis of said encoded signal and the information regarding said range conversion multiplier factor, and
said inverse quantization in accordance with said configured quantization step being effected for said signal which has undergone the inverse range conversion on the basis of said encoded signal.

* * * * *